(12) United States Patent
Zhou et al.

(10) Patent No.: US 12,675,853 B2
(45) Date of Patent: Jul. 7, 2026

(54) METHODS AND SYSTEMS FOR ADAPTIVE SLOPE-BASED DENOISING OF SINGLE-PHOTON LIDAR POINT CLOUDS

(71) Applicant: GUILIN UNIVERSITY OF TECHNOLOGY, Guilin (CN)

(72) Inventors: Guoqing Zhou, Guilin (CN); Yongkai Zhou, Guilin (CN); Yangleijing Li, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 0 days.

(21) Appl. No.: 19/284,821

(22) Filed: Jul. 30, 2025

(65) Prior Publication Data

US 2026/0038096 A1 Feb. 5, 2026

(30) Foreign Application Priority Data

Aug. 2, 2024 (CN) .......................... 202411059154.8

(51) Int. Cl.
G06T 5/70 (2024.01)
G06T 5/20 (2006.01)

(52) U.S. Cl.
CPC .................. G06T 5/70 (2024.01); G06T 5/20 (2013.01); *G06T 2207/10028* (2013.01)

(58) Field of Classification Search
None
See application file for complete search history.

(56) References Cited

FOREIGN PATENT DOCUMENTS

| | | |
|---|---|---|
| CN | 111665517 A | 9/2020 |
| CN | 115222625 | 10/2022 |
| CN | 116109751 | 5/2023 |
| CN | 116165635 A | 5/2023 |
| CN | 116385282 A | 7/2023 |

(Continued)

OTHER PUBLICATIONS

Silva, Carlos Alberto, et al. "Fusing simulated GEDI, ICESat-2 and NISAR data for regional aboveground biomass mapping." Remote Sensing of Environment 253 (2021): 112234. (Year: 2021).*

(Continued)

*Primary Examiner* — Luke D Ratcliffe
(74) *Attorney, Agent, or Firm* — PORUS IP LLC

(57) ABSTRACT

A method for adaptive slope-based denoising of single-photon LiDAR point clouds is provided, including: determining an adaptive slope value of the point cloud data; selecting point cloud data to be accessed, and constructing a quadrilateral denoising kernel of a preset size with the point cloud data to be accessed as a center; after deforming the quadrilateral denoising kernel according to an adaptive slope value, scaling in equal proportion and determining an along-track vertex distance of each piece of point cloud data; after scaling, designating point cloud data with a smallest along-track vertex distance as new point cloud data to be accessed, and repeating the above operations until all point cloud data becomes accessed point cloud data; according to the reachable distance of each piece of accessed point cloud data, determining a reachable distance threshold using Otsu's Thresholding (OTSU) algorithm, and removing the accessed point cloud data as a noise point.

10 Claims, 10 Drawing Sheets

(56) References Cited

FOREIGN PATENT DOCUMENTS

CN          117437147          1/2024

OTHER PUBLICATIONS

Gwenzi, David, et al. "Prospects of the ICESat-2 laser altimetry mission for savanna ecosystem structural studies based on airborne simulation data." ISPRS Journal of Photogrammetry and Remote Sensing 118 (2016): 68-82. (Year: 2016).*

Neuenschwander, Amy, and Katherine Pitts. "The ATL08 land and vegetation product for the ICESat-2 Mission." Remote sensing of environment 221 (2019): 247-259. (Year: 2019).*

Yang, Guangning, et al. "IceSat-2 ATLAS photon-counting receiver: initial on-orbit performance." Advanced photon counting techniques XIII. vol. 10978. SPIE, 2019.*

(Newly cited) Si, Shuming, et al. "Multiscale feature fusion for the multistage denoising of airborne single photon LiDAR." Remote Sensing 15.1 (2023): 269. (Year: 2023).*

First Office Action in Chinese Application No. 202411059154.8 mailed on Mar. 17, 2025, 10 pages.

Notification to Grant Patent Right for Invention in Chinese Application No. 202411059154.8 mailed on Apr. 30, 2025, 4 pages.

He, Peipei et al., Adaptive Slope Filtering Algorithm for LiDAR Point Clouds in Urban Areas, Remote Sensing Information, 32(5): 62-68, 2017.

Carlos Alberto Silva et al., Fusing simulated GEDI, ICESat-2 and NISAR data for regional aboveground biomass mapping, Remote Sensing of Environment, 2021, 14 pages.

Liu, Aobo et al., Performance evaluation of GEDI and ICESat-2 laser altimeter data for terrain and canopy height retrievals, Remote Sensing of Environment, 2021, 16 pages.

David Gwenzi et al., Prospects of the ICESat-2 laser altimetry mission for savanna ecosystem structural studies based on airborne simulation data, ISPRS Journal of Photogrammetry and Remote Sensing, 118: 68-82, 2016.

Amy Neuenschwander et al., The ATL08 land and vegetation product for the ICESat-2 Mission, Remote Sensing of Environment, 221: 247-259, 2019.

* cited by examiner

100

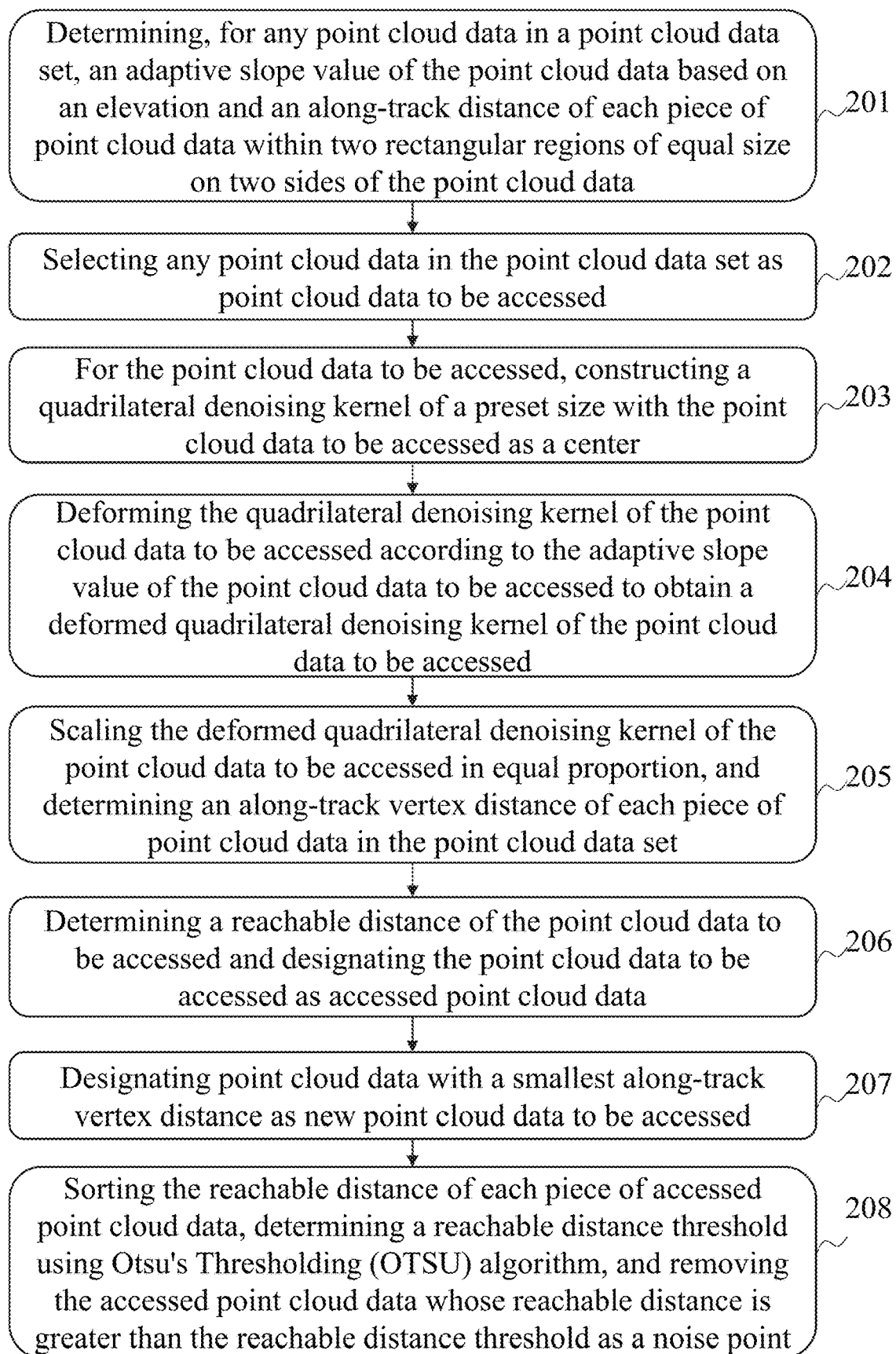

Determining, for any point cloud data in a point cloud data set, an adaptive slope value of the point cloud data based on an elevation and an along-track distance of each piece of point cloud data within two rectangular regions of equal size on two sides of the point cloud data ~201

Selecting any point cloud data in the point cloud data set as point cloud data to be accessed ~202

For the point cloud data to be accessed, constructing a quadrilateral denoising kernel of a preset size with the point cloud data to be accessed as a center ~203

Deforming the quadrilateral denoising kernel of the point cloud data to be accessed according to the adaptive slope value of the point cloud data to be accessed to obtain a deformed quadrilateral denoising kernel of the point cloud data to be accessed ~204

Scaling the deformed quadrilateral denoising kernel of the point cloud data to be accessed in equal proportion, and determining an along-track vertex distance of each piece of point cloud data in the point cloud data set ~205

Determining a reachable distance of the point cloud data to be accessed and designating the point cloud data to be accessed as accessed point cloud data ~206

Designating point cloud data with a smallest along-track vertex distance as new point cloud data to be accessed ~207

Sorting the reachable distance of each piece of accessed point cloud data, determining a reachable distance threshold using Otsu's Thresholding (OTSU) algorithm, and removing the accessed point cloud data whose reachable distance is greater than the reachable distance threshold as a noise point ~208

FIG. 2

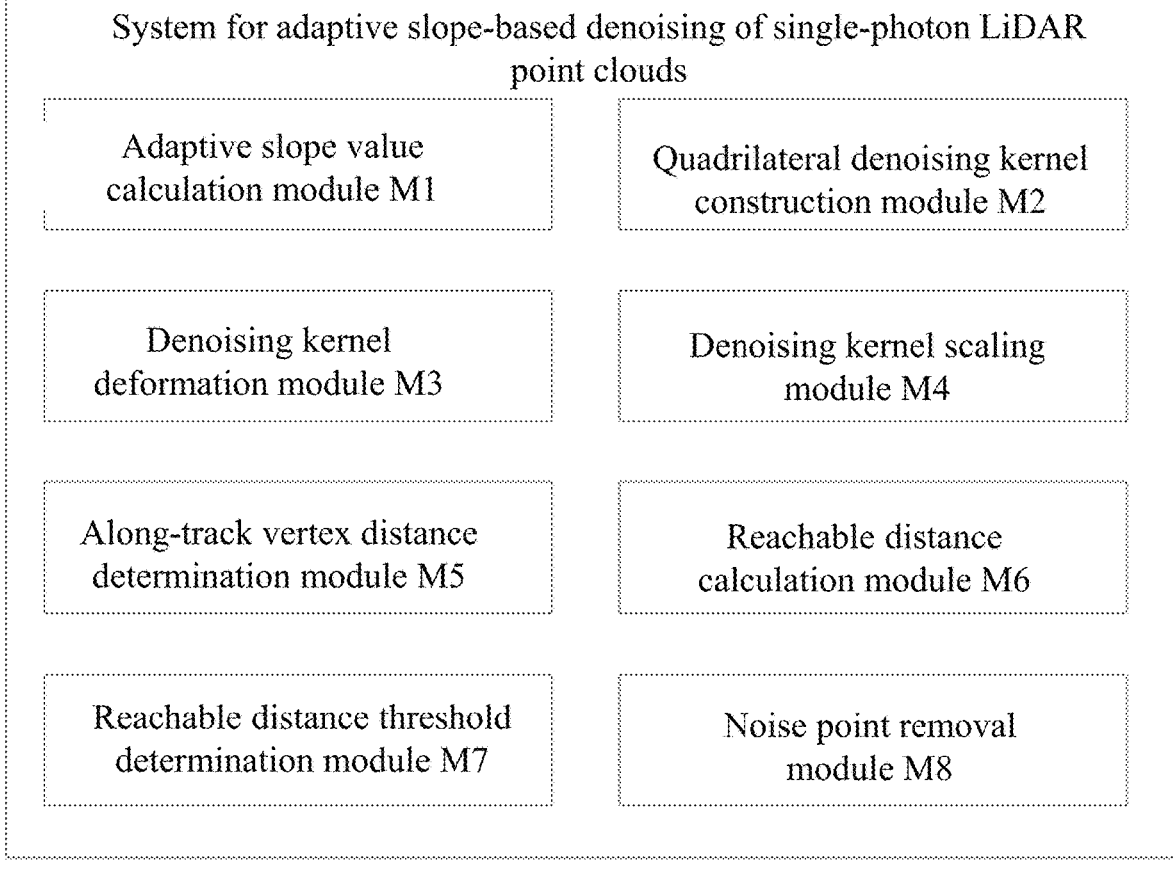

System for adaptive slope-based denoising of single-photon LiDAR point clouds

Adaptive slope value calculation module M1

Quadrilateral denoising kernel construction module M2

Denoising kernel deformation module M3

Denoising kernel scaling module M4

Along-track vertex distance determination module M5

Reachable distance calculation module M6

Reachable distance threshold determination module M7

Noise point removal module M8

FIG. 9

METHODS AND SYSTEMS FOR ADAPTIVE SLOPE-BASED DENOISING OF SINGLE-PHOTON LIDAR POINT CLOUDS

CROSS-REFERENCE TO RELATED APPLICATIONS

This application claims priority to Chinese Patent Application No. 202411059154.8, filed on Aug. 2, 2024, the contents of which are hereby incorporated by reference.

TECHNICAL FIELD

The present disclosure relates to technical field of photon point cloud denoising, and in particular to a method and system for adaptive slope-based denoising of single-photon LiDAR point clouds.

BACKGROUND

As a next-generation Earth observation technology, spaceborne single-photon LiDAR enables sub-meter-accuracy 3D terrain mapping by combining single-photon detection, GPS, and inertial navigation systems. Compared to conventional linear-mode LiDAR, it offers single-photon-level sensitivity, allowing for longer-range and more efficient ground object detection.

However, this extreme sensitivity also introduces major challenges: the relatively weak laser pulses of spaceborne single-photon LiDAR are susceptible to interference from atmospheric scattering, solar radiation, and target object scattering, generating excessive photon events. Since the system records all detected events as photon point clouds, resulting in the photon point clouds containing significantly more noise points than valid signal points. Current denoising algorithms for photon point clouds-whether optimizing noise filtering or clustering techniques-primarily rely on testing and analysis over oceans and flat terrains. In complex landscapes, particularly steep mountainous areas, the highly uneven spatial distribution of photon density often leads to misclassification between signal and noise points.

Therefore, it is necessary to provide a method and system for adaptive slope-based denoising of single-photon LiDAR point clouds to realize effective denoising of photon point clouds in complex terrain regions.

SUMMARY

One or more embodiments of the present disclosure provide a method for adaptive slope-based denoising of single-photon LiDAR point clouds, comprising: determining, for any point cloud data in a point cloud data set, an adaptive slope value of the point cloud data based on an elevation and an along-track distance of each piece of point cloud data within two rectangular regions of equal size on two sides of the point cloud data; selecting any point cloud data in the point cloud data set as point cloud data to be accessed; for the point cloud data to be accessed, constructing a quadrilateral denoising kernel of a preset size with the point cloud data to be accessed as a center; deforming the quadrilateral denoising kernel of the point cloud data to be accessed according to an adaptive slope value of the point cloud data to be accessed to obtain a deformed quadrilateral denoising kernel of the point cloud data to be accessed; scaling the deformed quadrilateral denoising kernel of the point cloud data to be accessed in equal proportion and determining an along-track vertex distance of each piece of point cloud data in the point cloud data set; wherein the along-track vertex distance of the point cloud data is a distance value from an along-track vertex to a center point of a newly generated quadrilateral denoising kernel of the point cloud data, which occurs when any edge of the deformed quadrilateral denoising kernel of the point cloud data to be accessed that is scaled in equal proportion collides with the point cloud data; determining a reachable distance of the point cloud data to be accessed and designating the point cloud data to be accessed as accessed point cloud data; designating point cloud data with a smallest along-track vertex distance as new point cloud data to be accessed, and jumping to the above operation including: for the point cloud data to be accessed, constructing a quadrilateral denoising kernel of a preset size with the point cloud data to be accessed as a center; until all point cloud data in the point cloud data set becomes accessed point cloud data; and sorting the reachable distance of each piece of accessed point cloud data, determining a reachable distance threshold using Otsu's Thresholding (OTSU) algorithm, and removing the accessed point cloud data whose reachable distance is greater than the reachable distance threshold as a noise point.

One or more embodiments of the present disclosure further provide a system for adaptive slope-based denoising of single-photon LiDAR point clouds, when executed by a computer, the system performs the above method for adaptive slope-based denoising of single-photon LiDAR point clouds.

Beneficial effects of the embodiments of the present disclosure include, but are not limited to that: by incorporating a great number of slope-related influencing factors of denoising based on complex terrain, and improving the denoising algorithm combined with the characteristics of different photon densities at different slopes, the denoising process exhibits better resistance under varying slopes and densities in actual terrain, enabling the constructed denoising kernel to achieve effective denoising even in extreme terrain.

BRIEF DESCRIPTION OF THE DRAWINGS

FIG. 2 is a flowchart illustrating a method for adaptive slope-based denoising of single-photon LiDAR point clouds according to some embodiments of the present disclosure;

FIG. 9 is a schematic diagram of functional modules of a system for adaptive slope-based denoising of single-photon LiDAR point clouds according to some embodiments of the present disclosure.

DETAILED DESCRIPTION

Figure 1:
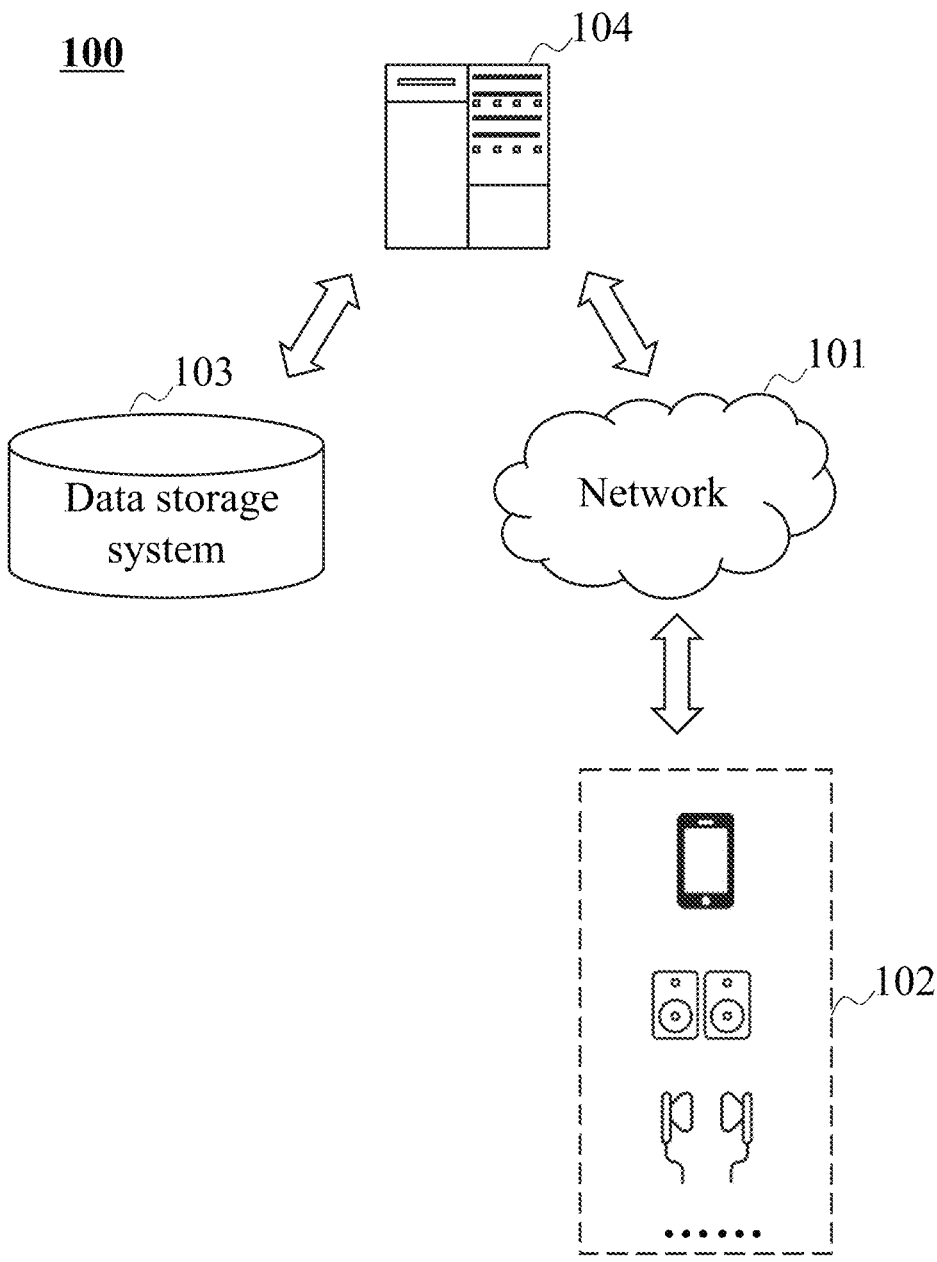
FIG. 1 is a diagram of an application environment of a method for adaptive slope-based denoising of single-photon LiDAR point clouds according to some embodiments of the present disclosure.

In order to more clearly illustrate the technical solutions of the embodiments of the present disclosure, the following provides a brief introduction to the drawings required in the description of the embodiments. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It will be understood that the terms "system", "device", "unit", and/or "module", used herein are one method to distinguish different components, elements, parts, sections, or assemblies of different levels in ascending order. However, the terms may be displaced by other expressions if they may achieve the same purpose.

As used herein, the singular forms "a", "an", and "the" may be intended to include the plural forms as well, unless the context clearly indicates otherwise. It will be further understood that the terms "include" and/or "comprise", when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a diagram of an application environment of a method for adaptive slope-based denoising of single-photon LiDAR point clouds according to some embodiments of the present disclosure.

The method for adaptive slope-based denoising of single-photon LiDAR point clouds provided by embodiments of the present disclosure may be applied in an application environment 100 as shown in FIG. 1. A terminal 102 communicates with a server 104 via a network 101. A data storage system 103 may store data needed to be processed by the server 104. The data storage system 103 may be set up separately, integrated into the server 104, or placed on the cloud or other servers. The terminal 102 may send a point cloud data set to be processed to the server 104. After receiving the point cloud data set to be processed, the server 104 executes the method for adaptive slope-based denoising of single-photon LiDAR point clouds mentioned in any of the following embodiments on the point cloud data set to be processed. The server 104 may feed back obtained denoising results to the terminal 102. In addition, in some embodiments, the method for adaptive slope-based denoising of single-photon LiDAR point clouds may also be implemented independently by the server 104 or the terminal 102. For example, the terminal 102 directly performs denoising processing on the point cloud data set to be processed, or the server 104 obtains the point cloud data set to be processed from the data storage system and perform the denoising processing on the point cloud data set to be processed.

The terminal 102 may be, but is not limited to, a variety of desktop computers, laptop computers, smartphones, tablet computers, Internet of Things (IoT) devices, and portable wearable devices. The IoT devices may be a smart speaker, a smart TV, a smart air conditioner, a smart vehicle-mounted device, or the like. The portable wearable devices may be a smart watch, a smart bracelet, a head-mounted device, or the like. The server 104 can be implemented by an independent server, a server cluster composed of multiple servers, or a cloud server.

FIG. 2 is a flowchart illustrating a method for adaptive slope-based denoising of single-photon LiDAR point clouds according to some embodiments of the present disclosure.

In some embodiments, as shown in FIG. 2, the method for adaptive slope-based denoising of single-photon LiDAR point clouds is executed by a computer device, which is specifically performed by the computer device such as a terminal or a server alone, or jointly by a terminal and a server. In some embodiments, the method is illustrated as an example of the method being applied to the server 104 in the FIG. 1, including the following steps 201 to 208.

Step 201, determining, for any point cloud data in a point cloud data set, an adaptive slope value of the point cloud data based on an elevation and an along-track distance of each piece of point cloud data within two rectangular regions of equal size on two sides of the point cloud data. Step 201 may be performed by the computer device.

The point cloud data set refers to a collection of original three-dimensional spatial data points obtained by a single-photon LiDAR. In some embodiments, each piece of point cloud data in the point data set may include an along-track distance, an elevation value, or the like.

The along-track distance refers to a horizontal distance along a flight direction of the LiDAR.

The elevation value refers to a vertical height relative to a reference datum. The reference datum may be a geoid, etc.

The rectangular regions on two sides of the point cloud data refer to regular rectangular regions constructed in the along-track direction (i.e., horizontal) and the elevation direction (i.e., vertical), centered on the point corresponding to the point cloud data.

In some embodiments, the equal size means that the two rectangular regions have the same length in the along-track direction and the same length in the elevation direction, respectively.

The adaptive slope value refers to an inclination angle of the local terrain where the position corresponding to the point cloud data is located. In some embodiments, the adaptive slope value ranges from 0° to 90°.

In some embodiments, in order to determine the adaptive slope value of the point cloud data, step 201 may include the following steps.

Step 2011, constructing, for any point cloud data in the point cloud data set, the two rectangular regions of equal size with the point cloud data as a center point; wherein a length of each of the two rectangular regions in an elevation direction is two times a length in an along-track direction.

For example, if the length of the rectangular region in the along-track direction is set as L, the length in the elevation direction is 2L.

By setting the length of the rectangular region in the elevation direction to be twice that in the along-track direction, it is possible to enhance the sensitivity to elevation changes in the vertical direction, to balance the information collection in the horizontal and vertical directions, and to adapt to the sparse distribution characteristics of single-photon LiDAR data in steep slope regions.

Step 2012, obtaining the adaptive slope value of the point cloud data based on the elevation and the along-track distance of each piece of point cloud data within the two rectangular regions.

Merely by way of example, the computer device may determine the adaptive slope value of the point cloud data according to the following formula (1):

$$\theta = \arctan(b); \tag{1}$$

where $\theta$ is the adaptive slope value of the point cloud data, and b is a slope value of the point cloud data.

In some embodiments, the slope value of the point cloud data may be determined based on a length in the elevation direction and a length in the along-track direction of a rectangular region on a left side of the point cloud data, and a length in the elevation direction and a length in the along-track direction of a rectangular region on a right side of the point cloud data. For example, the computer device may designate a difference between the length in the elevation direction of the right rectangular region and the length in the elevation direction of the left rectangular region as a first difference, designate a difference between the length in the along-track direction of the right rectangular region and the length in the along-track direction of the left rectangular region as a second difference, and determine a ratio of the first difference to the second difference as the slope value of the point cloud data. Merely by way of example, the slope value of the point cloud data may be determined by the following formula (2):

$$b = \frac{h_r - h_1}{l_r - l_1}; \tag{2}$$

where $h_1$ and $l_1$ are the length in the elevation direction and the length in the along-track direction of the rectangular region on the left side of the point cloud data, respectively, and $h_r$ and $l_r$ are the length in the elevation direction and the length in the along-track direction of the rectangular region on the right side of the point cloud data, respectively.

Step 202, selecting any point cloud data in the point cloud data set as point cloud data to be accessed. Step 202 may be performed by the computer device.

The point cloud data to be accessed refers to specific point cloud data used for determining the adaptive slope value.

In some embodiments, the computer device randomly determines any one piece of point cloud data from the point cloud data set as the point cloud data to be accessed.

Step 203, for the point cloud data to be accessed, constructing a quadrilateral denoising kernel of a preset size with the point cloud data to be accessed as a center. Step 203 may be performed by the computer device.

The quadrilateral denoising kernel refers to a rectangular region where the denoising operation is performed.

In some embodiments, the computer device may construct the quadrilateral denoising kernel with the point cloud data to be accessed as the center in a plurality of ways, where the quadrilateral denoising kernel has side lengths or an area reaching a preset size. The preset size may be a system default value, an empirical value, a manually pre-set value, etc., or any combination thereof. The preset size may also be set according to the actual needs, which is not limited by the present disclosure.

In some embodiments, in order to construct the quadrilateral denoising kernel, step 203 may include the following steps.

Step 2031, for the point cloud data set, establishing a plane rectangular coordinate system with an along-track direction of all point cloud data as a positive direction of x-axis, and an elevation direction of all point cloud data (i.e., an upward direction perpendicular to the sea level) as a positive direction of y-axis.

Step 2032, establishing a quadrilateral denoising kernel of a preset size with a slope of 0 in the plane rectangular coordinate system with the point cloud data to be accessed as a center point O; wherein the quadrilateral denoising kernel has four vertices clockwise from an upper left corner as a, b, c, and d, respectively, a length of the quadrilateral denoising kernel in the along-track direction is S, and a length in the elevation direction is h.

In some embodiments, the quadrilateral denoising kernel of a preset size may mean that the length S of the quadrilateral denoising kernel in the along-track direction is a first preset length, and the length h in the elevation direction is a second preset length.

In some embodiments, the quadrilateral denoising kernel of a preset size may mean that the area of the quadrilateral denoising kernel is a preset area. Correspondingly, when constructing the quadrilateral denoising kernel, there are at least two choices for the length S of the quadrilateral denoising kernel in the along-track direction and the length h in the elevation direction.

The first preset length, the second preset length, and the preset area may be a system default value, an empirical value, a manually pre-set value, etc., or any combination thereof. The first preset length, the second preset length, and the preset area may also be set according to actual needs, which is not limited by the present disclosure.

It should be noted that when dealing with terrain where large-scale gentle slopes and local steep slopes coexist, the quadrilateral denoising kernel of a fixed size may not be effective enough. In order to effectively deal with the situation, the computer device may dynamically and automatically determine quadrilateral denoising kernels of different shapes and sizes based on terrain characteristics. For example, the computer device uses quadrilateral denoising kernels with larger areas for gentle slope regions and quadrilateral denoising kernels with smaller areas for steep slope regions.

In some embodiments, the computer device may determine the length S of the quadrilateral denoising kernel in the along-track direction and the length h in the elevation direction by querying a first preset table based on an associated density and an adaptive slope value of the point cloud data to be accessed.

The associated density refers to a point cloud density within a surrounding region of the point cloud data to be accessed. The size of the surrounding region may be preset based on prior experience.

In some embodiments, the first preset table may include corresponding relationships among the associated densities and the adaptive slope values of different point cloud data and lengths S in the along-track direction and lengths h in the elevation direction of actually adopted quadrilateral denoising kernels. For example, the corresponding relationships in the first preset table may include that when the associated density is less than 3 points/m$^2$ and the adaptive slope value is less than or equal to 10°, the length S of the corresponding quadrilateral denoising kernel in the along-track direction is 120 m, and the length h of the corresponding quadrilateral denoising kernel in the elevation direction is 60 m.

In some embodiments, the first preset table may be constructed based on a large amount of historical data, or the like. For example, the first preset table may be constructed based on historical point cloud collection records with good denoising effects. The quality of the denoising effect may be determined by human labeling by a technician.

In some embodiments, the length S in the along-track direction and the length h in the elevation direction of the quadrilateral denoising kernel are negatively correlated with the associated density and the adaptive slope value of the point cloud data to be accessed. For example, the greater the associated density and the adaptive slope value of the point cloud data to be accessed, the smaller the length S in the along-track direction and the length h in the elevation direction of the quadrilateral denoising kernel.

In some embodiments of the present disclosure, by dynamically adjusting the size of the quadrilateral denoising kernel based on the associated density and the adaptive slope value of the point cloud data to be accessed, the denoising accuracy for complex terrain can be effectively improved.

In some embodiments, the computer device may further perform terrain region division on the point cloud data in the point cloud data set through a clustering algorithm, and determine the length S in the along-track direction and the length h in the elevation direction of the quadrilateral denoising kernel based on a terrain region type where the point cloud data to be accessed is located.

There are a plurality of types of clustering algorithms. For example, clustering algorithms may include density-based clustering (e.g., DBSCAN), K-Means clustering, or the like.

In some embodiments, an input of the clustering algorithm may include geometric features of the point cloud data. The geometric features of the point cloud data may include elevations $y^a$ and $y^b$, along-track distances $x^a$ and $x^b$, and the adaptive slope value $\theta$. In some embodiments, the computer device may construct a feature space for clustering based on the geometric features of the point cloud data. For example, the feature space may be (elevations $y^a$, $y^b$ along-track distances $x^a$, $x^b$).

More descriptions regarding the elevations $y^a$ and $y^b$, the along-track distances $x^a$ and $x^b$, and the adaptive slope value $\theta$ may be found in step 2052 and relevant descriptions thereof.

In some embodiments, the computer device may cluster the point cloud data in the point cloud data set based on the clustering algorithm to obtain a plurality of clusters. Each cluster includes a plurality of pieces of point cloud data having similar spatial positions, wherein the similar spatial positions refer to a similarity of features such as elevations $y^a$ and $y^b$, adaptive slope value $\theta$, and along-track distances $x^a$ and $x^b$. The similarity means that the difference is smaller than a preset threshold condition, which may be specifically set according to actual needs.

In some embodiments, the computer device may perform post-processing on the plurality of clusters to divide terrain regions where the point cloud data is located. The post-processing refers to a processing way for determining the terrain region type where the point cloud data is located.

In some embodiments, the terrain region type may include a flatland type, a gentle slope type, a steep slope type, or the like.

In some embodiments, the post-processing may include merging similar clusters, and determining the terrain region type associated with different categories of point cloud data by analyzing the geometric features of each cluster.

For example, the computer device may classify the terrain region type of point cloud data with a small adaptive slope value $\theta$ (e.g., less than a set threshold) and dense distribution as the flatland type.

In some embodiments, the computer device may determine the length S in the along-track direction and the length h in the elevation direction of the quadrilateral denoising kernel by querying a second preset table based on the terrain region type where the point cloud data to be accessed is located.

In some embodiments, the parameters of the second preset table may include corresponding relationships between the terrain region type and the length S in the along-track direction and the length h in the elevation direction of the quadrilateral denoising kernel. For example, the corresponding relationship of parameters in the second preset table may include that when the terrain region is in the flatland type, the length S of the corresponding quadrilateral denoising kernel in the along-track direction is 100 m, and the length h of the corresponding quadrilateral denoising kernel in the elevation direction is 50 m.

In some embodiments, the second preset table may be constructed based on a large amount of historical data, etc. For example, the second preset table may be constructed based on historical point cloud collection records with good denoising effects and covering different regional types.

In some embodiments of the present disclosure, by dividing the terrain region type where the point cloud data is located and then selecting quadrilateral denoising kernels of different sizes, the denoising accuracy and efficiency can be further improved.

Step 204, deforming the quadrilateral denoising kernel of the point cloud data to be accessed according to the adaptive slope value of the point cloud data to be accessed to obtain a deformed quadrilateral denoising kernel of the point cloud data to be accessed. Step 204 may be performed by the computer device.

In some embodiments, the computer device may deform the quadrilateral denoising kernel in a plurality of ways. For example, the computer device may change the positions of vertices a, b, c, and d of the quadrilateral denoising kernel to achieve deformation.

Figure 3:
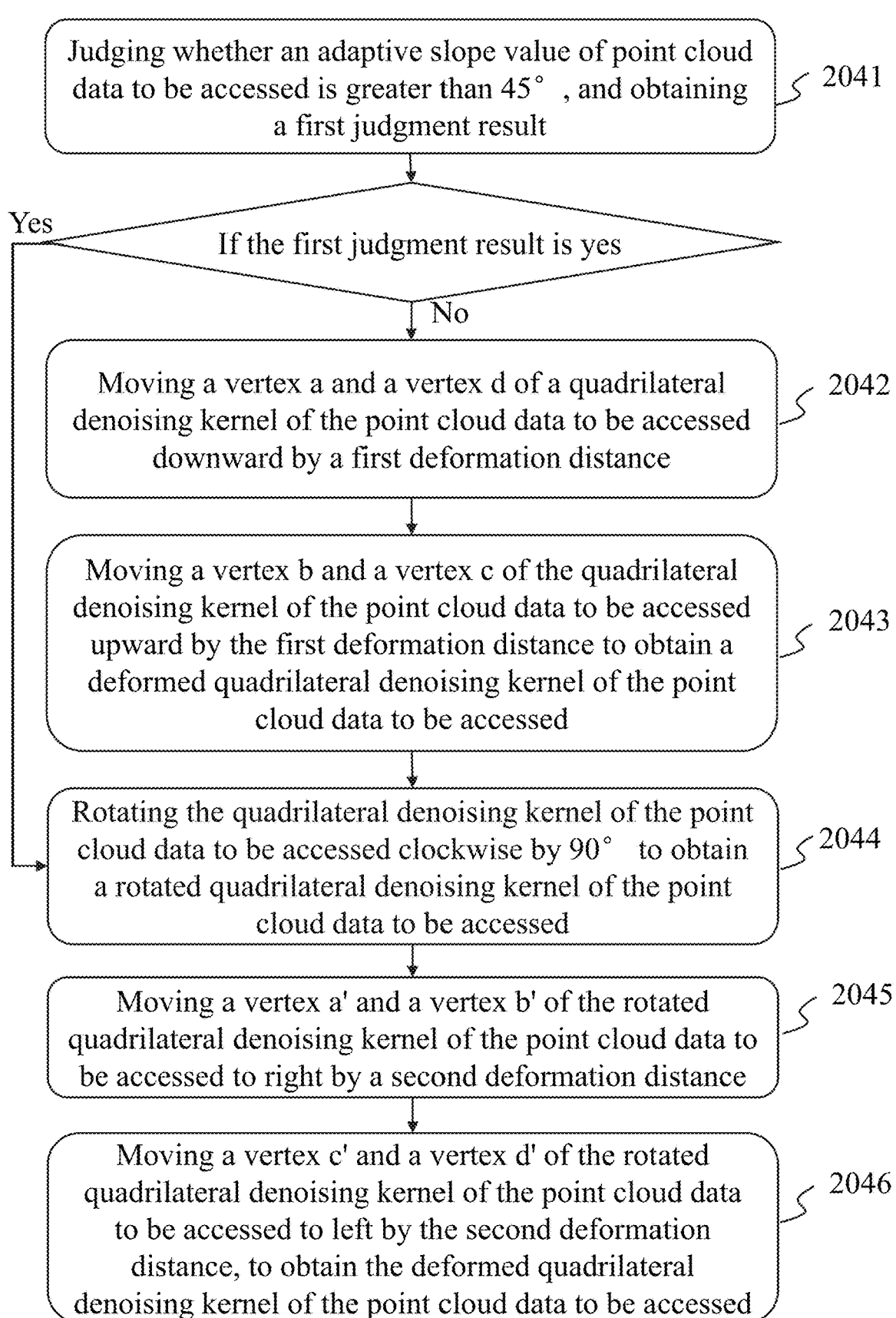
FIG. 3 is a detailed flowchart of step 204 in a method for adaptive slope-based denoising of single-photon LiDAR point clouds according to some embodiments of the present disclosure.

FIG. 3 is a detailed flowchart of step 204 in a method for adaptive slope-based denoising of single-photon LiDAR point clouds according to some embodiments of the present disclosure.

In some embodiments, as shown in FIG. 3, in order to deform the quadrilateral denoising kernel, step 204 may include the following steps.

Step 2041, judging whether an adaptive slope value of the point cloud data to be accessed is greater than 45°, and obtaining a first judgment result. If the first judgment result is no, steps 2042 to 2043 are performed. If the first judgment result is yes, steps 2044 to 2046 are performed.

Step 2042, moving the vertex a and the vertex d of the quadrilateral denoising kernel of the point cloud data to be accessed downward by a first deformation distance.

Step 2043, moving the vertex b and the vertex c of the quadrilateral denoising kernel of the point cloud data to be accessed upward by the first deformation distance to obtain the deformed quadrilateral denoising kernel of the point cloud data to be accessed.

The first deformation distance refers to a vertical displacement for adjusting the vertices of the quadrilateral denoising kernel of the point cloud data to be accessed. In some embodiments, the first deformation distance is (h×tan θ)/2, where h is the length of the quadrilateral denoising kernel in the elevation direction.

Step 2044, rotating the quadrilateral denoising kernel of the point cloud data to be accessed clockwise by 90° to obtain a rotated quadrilateral denoising kernel of the point cloud data to be accessed.

The rotated quadrilateral denoising kernel of the point cloud data to be accessed has four vertices counterclockwise from an upper right corner as a', b', c', and d'.

Step 2045, moving the vertex a' and the vertex b' of the rotated quadrilateral denoising kernel of the point cloud data to be accessed to right by a second deformation distance.

Step 2046, moving the vertex c' and the vertex d' of the rotated quadrilateral denoising kernel of the point cloud data to be accessed to left by the second deformation distance, to obtain the deformed quadrilateral denoising kernel of the point cloud data to be accessed.

The second deformation distance refers to a horizontal displacement for adjusting the vertices of the quadrilateral denoising kernel of the point cloud data to be accessed. In some embodiments, the second deformation distance is h/2 tan|θ|.

Step 205, scaling the deformed quadrilateral denoising kernel of the point cloud data to be accessed in equal proportion, and determining an along-track vertex distance of each piece of point cloud data in the point cloud data set. Step 205 may be performed by the computer device.

In some embodiments, the scaling proportion may be a system default value, an empirical value, a manually pre-set value, etc., or any combination thereof. The scaling ratio may also be set according to the actual needs, which is not limited by the present disclosure.

The along-track vertex distance refers to a distance value from an along-track vertex to a center point of a newly generated quadrilateral denoising kernel of the point cloud data, which occurs when any edge of the deformed quadrilateral denoising kernel of the point cloud data to be accessed that is scaled in equal proportion collides with the point cloud data.

In some embodiments, in order to determine the along-track vertex distance of the point cloud data, step 205 may include the following steps.

Step 2051, scaling the deformed quadrilateral denoising kernel of the point cloud data to be accessed in equal proportion, and when any edge of the deformed quadrilateral denoising kernel of the point cloud data to be accessed that is scaled in equal proportion collides with the point cloud data, taking the point cloud data to be accessed as a center point, generating the quadrilateral denoising kernel (hereinafter referred to as a candidate quadrilateral denoising kernel) of the point cloud data (i.e., at least one point cloud data that is collided with) through the point cloud data (i.e., the at least one point cloud data that is collided with), until only the point cloud data to be accessed remains in the quadrilateral denoising kernel (i.e., the candidate quadrilateral denoising kernel).

Step 2052, for the generated quadrilateral denoising kernel (i.e., the candidate quadrilateral denoising kernel) of the point cloud data (i.e., the at least one point cloud data that is collided with) when the deformed quadrilateral denoising kernel of the point cloud data to be accessed is scaled in equal proportion, determining the along-track vertex distance of the point cloud data (i.e., the at least one point cloud data that is collided with).

Merely by way of example, the computer device may determine the along-track vertex distance of the point cloud data (i.e., the at least one point cloud data that is collided with) according to the following formula (3):

$$\sqrt{\left(a\times\frac{S}{2}\right)^2 + \left(a\times\frac{h_0}{2}\right)^2} = W; \tag{3}$$

$$\mathrm{Max}(a_1, a_2) = a;$$

$$\begin{cases} \left|\dfrac{|y^a - y^b| - |(x^a - x^b)\times\tan\theta|}{S/2}\right| = a_1, \left|\dfrac{y^a - y^b}{h/2}\right| = a_2, |\theta| \le 45° \\ \left|\dfrac{|x^a - x^b| - |(y^a - y^b)\times\cot\theta|}{S/2}\right| = a_1, \left|\dfrac{y^a - y^b}{h/2}\right| = a_2, |\theta| > 45° \end{cases},$$

where W is the along-track vertex distance of the point cloud data, and $h_0$ is the initial length of the quadrilateral denoising kernel of the point cloud data to be accessed in the elevation direction, S is the length of the quadrilateral denoising kernel of the point cloud data to be accessed in the along-track direction, $y^a$ and $y^b$ represent elevations of points a (i.e., vertex a) and b (i.e., vertex b), respectively, $x^a$ and $x^b$ represent along-track distances of the points a and b, respectively, and θ is the adaptive slope value of the point cloud data to be accessed.

Step 206, determining a reachable distance of the point cloud data to be accessed and designating the point cloud data to be accessed as accessed point cloud data. Step 206 may be performed by the computer device.

The reachable distance refers to a parameter used to quantify topographic continuity between point cloud data.

The accessed point cloud data refers to the point cloud data to be accessed for which the reachable distance has been determined.

In some embodiments, the computer device may determine the reachable distance of the point cloud data to be accessed based on a denoising threshold, a count of points (i.e., a count of pieces of point cloud data) within a given radius of any one piece of point cloud data, and the along-track vertex distance.

Merely by way of example, the computer device may determine the reachable distance of the point cloud data to be accessed according to the following formula (4):

$$RD_R(O_0, O_i) = \begin{cases} \emptyset, N_R(O_0) < MP \\ \mathrm{Max}(CD(O_0), W(O_0, O_i)), N_R(O_0) > MP \end{cases}; \tag{4}$$

$$CD(O_0) = \begin{cases} \emptyset, N_R(O_0) < MP \\ W, N_R(O_0) \ge MP \end{cases},$$

where MP is a denoising threshold, $N_R(O_0)$ is a count of points within a given radius R of the point cloud data $O_0$, W is the along-track vertex distance of the point cloud data $O_0$, Ø is a null set, $RD_R(O_0, O_i)$ is the reachable distance of the point cloud data $O_i$ to be accessed, RD(i) is a shorthand for $RD_R(O_0, O_i)$, $W(O_0, O_i)$ is W value of all surrounding point clouds calculated with $O_0$ as a center point cloud, and $W_i$ is a shorthand of $W(O_0, O_i)$.

In some embodiments, the denoising threshold may be preset based on priori experience.

Step 207, designating point cloud data with a smallest along-track vertex distance as new point cloud data to be accessed, and jumping to step 203; until all the point cloud data in the point cloud data set becomes accessed point cloud data. Step 207 may be performed by the computer device.

Step 20₀, sorting the reachable distance of each piece of accessed point cloud data, determining a reachable distance threshold using Otsu's Thresholding (OTSU) algorithm, and removing the accessed point cloud data whose reachable distance is greater than the reachable distance threshold as a noise point. Step 208 may be performed by the computer device.

The reachable distance threshold refers to a critical value used to distinguish effective topographic points from noise points.

In some embodiments, the computer device may dynamically determine the reachable distance threshold based on the OTSU algorithm. Merely by way of example, the computer device may determine the reachable distance threshold according to the following formula (5):

$$\omega_0(P) = \frac{P}{N};$$ (5);

$$\omega_1(P) = N - \frac{P}{N};$$

$$\mu_0(P) = \frac{\sum_{i=1}^{P} RD(i)}{P};$$

$$\mu_1(P) = \frac{\sum_{i=P+1}^{N} RD(i)}{N-P};$$

$$\mu(P) = \omega_0(P) \times \mu_0(P) + \omega_1(P) \times \mu_1(P);$$

$$\sigma^2(P) = \omega_0(P) \times (\mu_0(P) - \mu(P))^2 + \omega_1(P) \times (\mu_1(P) - \mu(P))^2,$$

where P is a labeling of current point cloud data to be accessed, N is a count of pieces of point cloud data, RD(i) is the reachable distance of an i-th point cloud data, and $\sigma^2(P)$ is an interclass variance of a signal point and a noise point; when $\sigma^2(P)$ is maximum, the RD is a threshold for determining denoising, i.e., the reachable distance threshold.

In some embodiments, the sorting may be performed in descending or ascending order, which may be specifically set according to the actual needs.

In some embodiments, the computer device may synthesize the point cloud data within the quadrilateral denoising kernel corresponding to each piece of the accessed point cloud data into a localized three-dimensional point cloud segment. The computer device stitches spatially neighboring three-dimensional point cloud segments, and excludes three-dimensional point cloud segments whose boundaries cannot be aligned to obtain a plurality of stitched point cloud segments. The computer device combines the plurality of stitched point cloud segments to form a continuous point cloud set that covers the point cloud collection region. The computer device sorts the reachable distance of each piece of the accessed point cloud data in the continuous point cloud set, and determines the reachable distance threshold using the OTSU algorithm, and removes the accessed point cloud data whose reachable distance is greater than the reachable distance threshold as a noise point.

It should be noted that the embodiments of the present disclosure impose no special restrictions on the manners of synthesis, stitching, exclusion, and combination, and operations familiar to those skilled in the art may be adopted.

In some embodiments of the present disclosure, excluding anomalous segments with discontinuous boundaries in advance before performing subsequent noise removal steps helps to improve the overall continuity of the point cloud data.

In some embodiments, the computer device may also determine an environmental impact degree based on environmental data, optical images, and terrain region types. The computer device determines a threshold correction coefficient based on the environmental impact degree, and determines the reachable distance threshold based on the threshold correction coefficient. More descriptions regarding the terrain region type may be found in the preceding relevant description.

The environmental data refers to surrounding environmental information when the LiDAR collects the point cloud data. The environmental data may include a light intensity, a temperature, a humidity, etc. The environmental data may be collected by a light sensor, a temperature sensor, a humidity sensor, etc., which is carried by the LiDAR.

The optical image refers to a photograph, a video, etc., of the point cloud data collection region obtained by image devices.

The environmental impact degree refers to a degree to which environmental factors adversely affect a signal-to-noise ratio of laser point clouds. The environmental impact degree may be set between 0 and 1, where a larger value indicates a harsher collection environment and more adverse effects on point cloud denoising.

In some embodiments, the computer device may query a vector database to determine the environmental impact degree based on the environmental data, the optical images, and the terrain region types. For example, the computer device may construct a feature vector to be matched based on the environmental data, the optical images, and the terrain region types, perform vector matching in the vector database based on the feature vector to be matched to determine an associated feature vector, and determine the environmental impact degree based on the associated feature vector.

In some embodiments, the computer device may perform feature extraction on the environmental data, the optical images, and the terrain region types to obtain the feature vector to be matched.

The vector database may include a plurality of reference feature vectors and corresponding reference degrees of environmental impact thereof. The reference feature vectors may be constructed based on historically collected environmental data, optical images, and terrain region types. For example, the computer device may select historical point cloud collection records with good denoising effects and covering different region types. For each historical point cloud collection record, the reference feature vector is constructed based on the environmental data, optical images, and the terrain region type (where the point cloud to be accessed is located) during collection. The good denoising effect refers to a high removal rate of noise points and a high retention rate of real ground points. For example, the removal rate of noise points and the retention rate of real ground points are respectively higher than their respective preset thresholds. The covering different region types may include divided terrain region types such as flat land, gentle slopes, steep slopes, etc.

The reference environmental impact degree may be determined based on the noise removal rate and the signal retention rate of the historical point cloud collection records. For example, the environmental impact degree in the historical point cloud collection records may be obtained by using the formula: the environmental impact degree=1−(w$_i$× Noise Removal Rate+w$_2$×Signal Retention Rate), where w$_1$ and w$_2$ may be set by the technician based on experience.

The noise removal rate refers to a ratio of a count of removed noise points to a total count of point clouds. The signal retention rate refers to a ratio of a count of retained point clouds to the total count of point clouds. The noise removal rate and the signal retention rate may be set by technicians based on experience.

The associated feature vector is a target feature vector selected from a plurality of reference feature vectors.

In some embodiments, the computer device may determine, based on the feature vector to be matched, the reference feature vector that meets preset conditions from the vector database as the associated feature vector. The preset conditions refer to conditions preset for determining the associated feature vectors. In some embodiments, the preset conditions may include that the vector distance meets a distance threshold, the vector distance is the smallest, or the like. In some embodiments, the computer device may determine the reference environmental impact degree corresponding to the associated feature vector as a current environmental impact degree.

The threshold correction coefficient is a parameter used to correct the reachable distance threshold.

In some embodiments, the threshold correction coefficient is negatively correlated with the environmental impact degree. The computer device may determine the threshold correction coefficient based on the environmental impact degree. The greater the environmental impact degree, the more prone to noise, which should be strictly controlled at this time, such as appropriately reducing the reachable distance threshold to eliminate more noise, etc.

In some embodiments, the computer device may determine a corrected reachable distance threshold based on an original reachable distance threshold and the threshold correction coefficient. The original reachable distance threshold may be a system default value, an empirical value, a manually pre-set value, etc., or any combination thereof. The original reachable distance threshold may also be a reachable distance threshold determined in some other manners.

In some embodiments of the present disclosure, when determining the reachable distance threshold, a more reasonable threshold can be determined by introducing the impact of the environment to help with noise removal.

In some embodiments, the computer device may also determine the noise points via a noise determination model based on the reachable distance threshold, the environmental data, the associated density of the point cloud data to be accessed, and the adaptive slope value. More descriptions regarding the associated density may be found in step 203 and relevant descriptions thereof.

In some embodiments, the noise determination model may be a machine learning model. For example, the noise determination model may include a Neural Network (NN) model. As another example, the noise determination model may also be any one or a combination of a plurality of feasible models such as a Recurrent Neural Network (RNN) model, a Deep Neural Network (DNN) model, a Convolutional Neural Network (CNN) model, etc.

In some embodiments, the noise determination model may be obtained based on training. The computer device may obtain a plurality of training samples with labels constituting a training sample set, and determine the noise determination model by training through the training sample set. The training samples may be obtained in historical data. In some embodiments, the computer device may obtain the training samples based on a plurality of historical point cloud collection records. For example, the computer device may construct the training samples and labels based on the historical point cloud collection records with good denoising effects.

In some embodiments, the training samples may include sample reachable distance thresholds, sample environmental data, associated densities of sample point cloud data to be accessed, and sample adaptive slope values. The labels may be noise marker values of the sample point cloud data to be accessed. The noise marker value may be 0 or 1, indicating a non-noise point cloud and a noise point cloud, respectively. The labels may be determined by the system or manually annotated.

In some embodiments, the computer device may input the training sample set into an initial noise determination model to perform a plurality of rounds of iterations. Each round of iteration includes: selecting one or more training samples from the training sample set, inputting the one or more training samples into the initial noise determination model to obtain model prediction outputs corresponding to the one or more training samples; substituting the model prediction outputs corresponding to the one or more training samples and the labels of the one or more training samples into a pre-defined loss function formula to calculate the value of the loss function; and reversely updating the model parameters in the initial noise determination model based on the value of the loss function. When the iteration termination condition is met, the iteration is ended, and the trained noise determination model is obtained. The iteration termination conditions may include convergence of the loss function, reaching the threshold of iteration times, etc.

In some embodiments of the present disclosure, determining the noise points in the point cloud data to be accessed via the noise determining model can utilize the self-learning capability of the machine learning model to find patterns from a plurality of historical point cloud collection records, and obtain the correlation between the noise points and the reachable distance threshold, the environmental data, the associated density of the point cloud data to be accessed, and the adaptive slope values, so as to improve the accuracy and efficiency of determining the noise points.

In some embodiments of the present disclosure, the denoising algorithm is improved by incorporating a great number of slope-related influencing factors of denoising based on complex terrain, combined with the characteristics of different photon densities at different slopes. The denoising algorithm exhibits better resistance under varying slopes and densities in actual terrain, enabling the constructed denoising kernel to achieve effective denoising even in extreme terrain.

In some embodiments, after determining the noise point, the computer device may generate a high-precision map of the point cloud collection region by combining a plurality of pieces of point cloud data after removing the noise point from the point cloud data set, and transmit the high-precision map to a remote location for storage.

In the embodiments of the present disclosure, there is no special limitation on the manner of generating the high-precision map, and operations well-known to those skilled in the art may be adopted.

Figure 4:
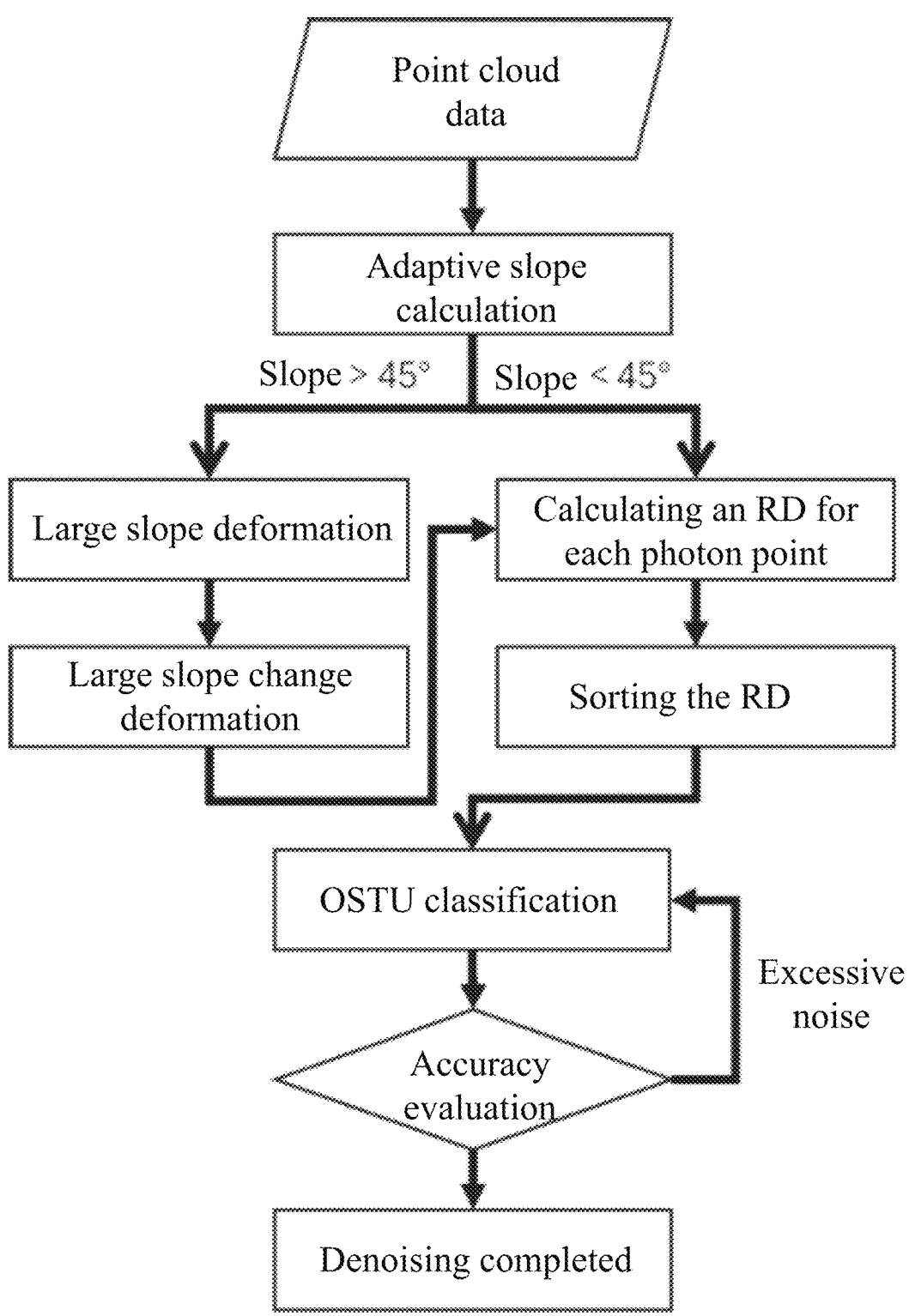
FIG. 4 is a schematic flowchart illustrating a method for adaptive slope-based denoising of single-photon LiDAR point clouds according to some embodiments of the present disclosure.
Figure 5:
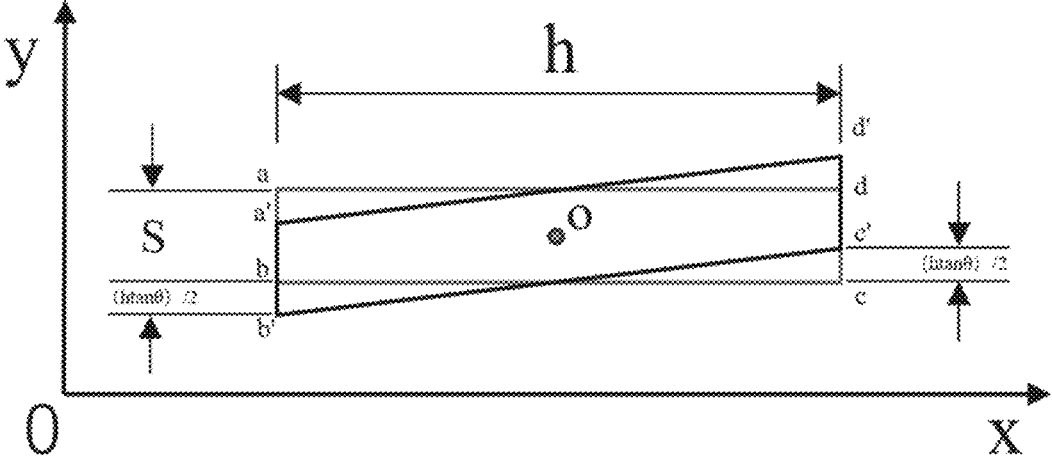
FIG. 5 is a schematic diagram illustrating a deformation process of a quadrilateral denoising kernel in the method for adaptive slope-based denoising of single-photon LiDAR point clouds as shown in FIG. 4 of the present disclosure.
Figure 6:
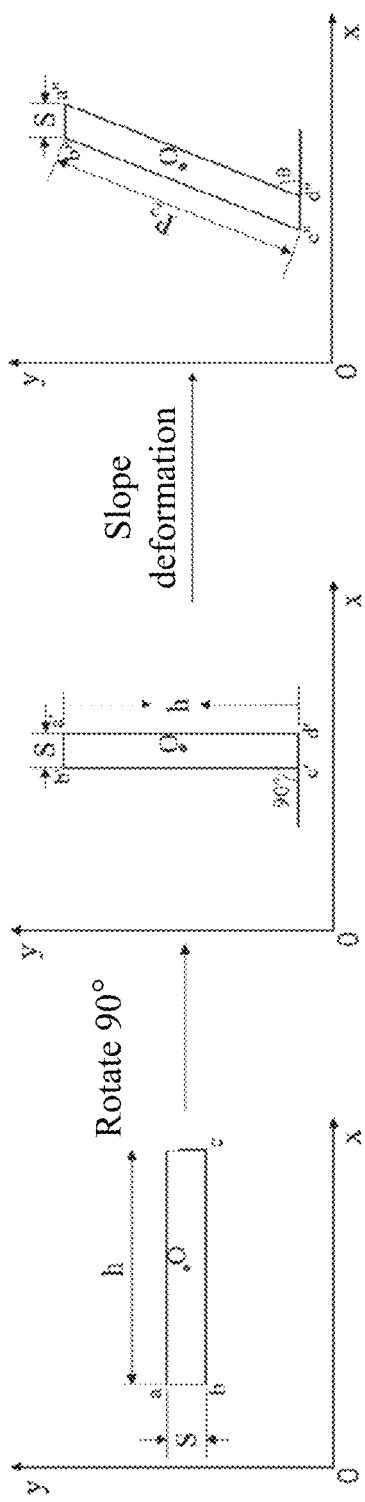
FIG. 6 is a schematic diagram illustrating a deformation process of a quadrilateral denoising kernel after rotation in the method for adaptive slope-based denoising of single-photon LiDAR point clouds as shown in FIG. 4 of the present disclosure.
Figure 7:
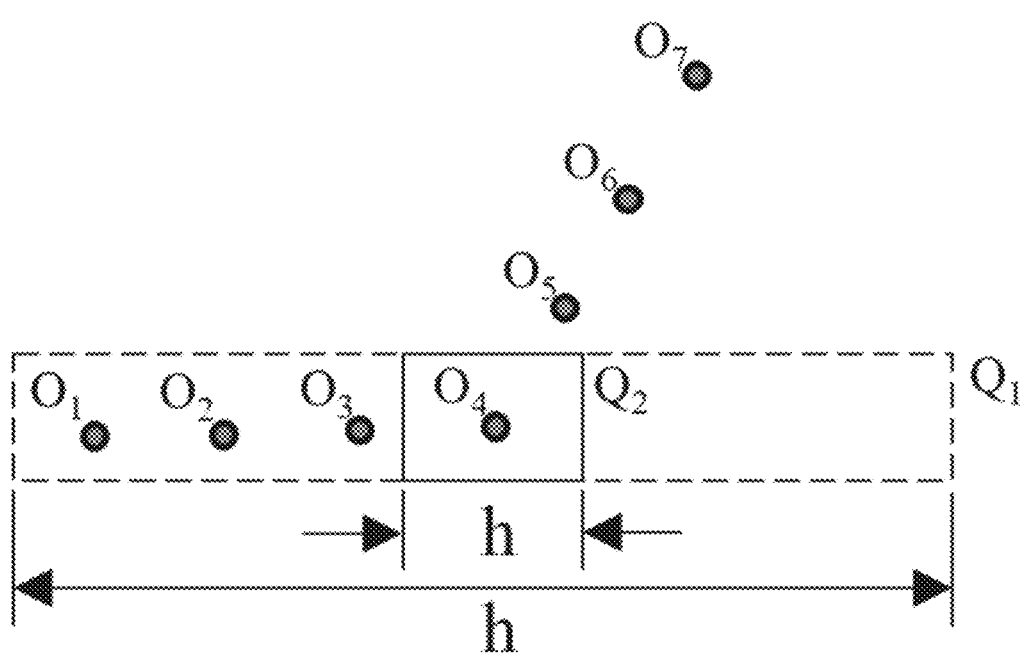
FIG. 7 is a schematic diagram illustrating a deformation process of an initial radius $h_0$ in the method for adaptive slope-based denoising of single-photon LiDAR point clouds as shown in FIG. 4 of the present disclosure.
Figure 8:
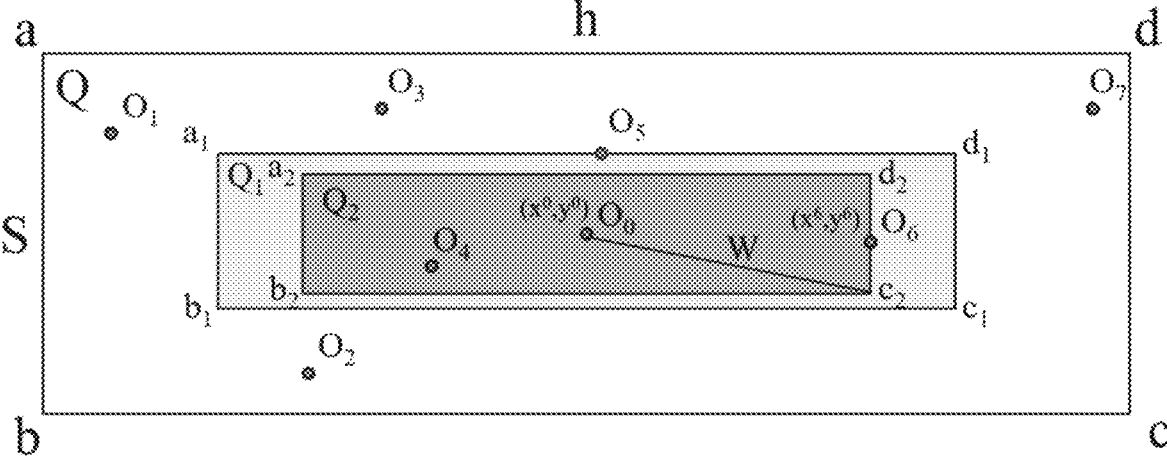
FIG. 8 is a schematic diagram illustrating a proportional scaling process of a quadrilateral denoising kernel in the method for adaptive slope-based denoising of single-photon LiDAR point clouds as shown in FIG. 4 of the present disclosure.

FIG. 4 is a schematic flowchart illustrating a method for adaptive slope-based denoising of single-photon LiDAR point clouds according to some embodiments of the present disclosure. FIG. 5 is a schematic diagram illustrating a deformation process of a quadrilateral denoising kernel in the method for adaptive slope-based denoising of single-photon LiDAR point clouds as shown in FIG. 4 of the present disclosure. FIG. 6 is a schematic diagram illustrating a deformation process of a quadrilateral denoising kernel after rotation in the method for adaptive slope-based denoising of single-photon LiDAR point clouds as shown in FIG. 4 of the present disclosure. FIG. 7 is a schematic diagram illustrating a deformation process of an initial radius $h_0$ in the method for adaptive slope-based denoising of single-photon LiDAR point clouds as shown in FIG. 4 of the present disclosure. FIG. 8 is a schematic diagram illustrating a proportional scaling process of a quadrilateral denoising kernel in the method for adaptive slope-based denoising of single-photon LiDAR point clouds as shown in FIG. 4 of the present disclosure.

In some embodiments, as shown in FIG. 4, the steps of the above method for adaptive slope-based denoising of single-photon LiDAR point clouds may be replaced by the following steps.

Step 1) Two rectangular regions distributed left and right centered on a target point may be constructed to select point cloud data. A length of each of the two rectangular regions in an elevation direction is set to be two times a length in an along-track direction. The average elevation values $h_1$ and $h_r$ and the average along-track distances $l_1$ and $l_r$ of all point cloud data in the left and right rectangular regions are determined, respectively. The adaptive slope value $\theta$ is determined based on the average values. More descriptions on determining the slope value b and adaptive slope value $\theta$ may be found in step 201 and relevant descriptions thereof.

In some embodiments, the adaptive slope value may be obtained by performing the process of step 1) for each point corresponding to the point cloud data.

In some embodiments, the target point refers to a point corresponding to the point cloud data selected from the point cloud data set.

In some embodiments, when the adaptive slope value $\theta$ exceeds 45°, the computer device rasterizes the entire image corresponding to the point cloud data set from a direction perpendicular to the ground to obtain a lowest elevation point within each grid.

Rasterizing from a direction perpendicular to the ground refers to establishing a grid system along the surface normal direction (i.e., the direction perpendicular to the local ground).

For example, the computer device may fit a local terrain plane through adjacent points, determine a normal direction of the local terrain plane, establish a new coordinate system with the normal direction as the Z' axis, rotate and transform the original point cloud coordinates, and perform a regular voxel division in the new coordinate system to obtain the grid system. For example, the computer device may use a grid size of 5 m×5 m×0.5 m (length×width×height) for the regular voxel division.

The lowest elevation point in the grid refers to point cloud data with the minimum elevation value among a plurality of pieces of point cloud data within the grid.

In some embodiments, the computer device may determine a slope value of a center grid based on the slopes of the center grid with its eight adjacent grids.

The central grid refers to a grid located at the central position among a plurality of grids corresponding to the entire image. The eight adjacent grids of the central position include one adjacent grid respectively at the eight positions of upper, lower, left, right, upper-left, lower-left, upper-right, and lower-right.

For example, the computing device determines the slopes between the central grid and its 8 adjacent grids, and finally determines the average as the slope value of the center grid using the following formula (6):

$$\theta = \arctan\sqrt{(dz/dx)^2 + (dz/dy)^2} \; ; \qquad (6)$$

where dz/dx and dz/dy represent rates of change of the center grid in the x and y directions, respectively.

Step 2) For the point cloud data set, a coordinate system with the along-track direction as the positive x-axis and the elevation direction as the positive y-axis may be established. Any point in the point cloud is selected and labeled as O. A quadrilateral denoising kernel is constructed centered on the photon point O, composed of corner points a, b, c, and d, with length S, width h, and slope $\theta$. The quadrilateral denoising kernel includes n+1 photon points such as O and $O_i$ (i=1, 2, . . . , n).

Step 3) The parallelogram quadrilateral denoising kernel may be deformed as shown in FIG. 5. The point a and point b are moved downward to positions a' and b', the point c and point d are moved upward to positions c' and d', while keeping the abscissas of a', b', c', and d' unchanged. The deformation maintains the length S and width h of the parallelogram quadrilateral denoising kernel.

Step 4) If the slope is too large, the deformation is shown in FIG. 6. When the slope exceeds 45°, the denoising kernel is rotated 900 clockwise around point O to generate a new denoising kernel, composed of corner points a', b', c', d'. The vertices a' and b' are moved rightward by a distance of h/2 tan|θ| to become a" and b", the vertices c' and d' are moved leftward by the same distance h/2 tan|θ| to become c" and d", while keeping the ordinates unchanged.

Step 5) To further adapt to potential situations of drastic slope changes, the initially set radius $h_0$ may be adjusted with a certain degree of deformation. As shown in FIG. 7, when determining the slope along the horizontal increment direction, the angles $\theta_a$ and $\theta_b$ of point a and point b, respectively, detected near the photon point coordinates ($x^a$, $y^a$) of photon point a at a distance of 20 meters, satisfy the condition|θa−θb|>45°. If photon points meeting the condition exist, the coordinates ($x^b$, $y^b$) of the nearest photon point b are selected. Then the slope change deformation coefficient D is determined. The closer the along-track distance, the greater the slope change, and the larger the value of the slope change deformation coefficient D. As a result, the denoising kernel is shorter when it is closer to the region with large terrain slope changes, and the denoising threshold is also reduced by a corresponding multiple. More descriptions regarding the initially set radius $h_0$, the angle $\theta_a$ at point a and the angle $\theta_b$ at point b, and coordinates ($x^b$, $y^b$) may be found in step 2052 and relevant descriptions thereof.

By deforming the initially set radius $h_0$ to a certain extent, when the slope changes relatively drastically, it can effectively reduce the situation that the denoising kernel of the target point is too long to deviate from the target region, make the denoising kernel more adaptable to the actual terrain changes, and thus reduce a large number of misclassifications in the region with large slope changes.

Step 6) The horizontal-to-vertical ratio of the denoising kernel may be maintained during contraction. The denoising kernel stops shrinking when any edge (such as the a-b edge) of the denoising kernel coincides with a photon point. As shown in FIG. 8, the edge a-d passes through the photon point $O_5$ to generate a new parallelogram quadrilateral denoising kernel $Q_1$, which consists of four corner points $a_1$, $b_1$, $c_1$ and $d_1$. Repeating the above steps, the edge c-d passes through the photon point $O_6$ to generate a new parallelogram quadrilateral denoising kernel $Q_2$, which consists of the four corner points $a_2$, $b_2$, $c_2$, and $d_2$.

Step 7) Continue to shrink the denoising kernel, same as step 5). The distance $W_i$ is recorded for the remaining n photon points $O_i$ (i=1, 2, . . . , n) in the denoising kernel. The shrinking process stops when the denoising kernel is reduced to only one photon point. $W_i$ is a distance from the vertices of the denoising kernel generated through the photon point in the along-track direction to the center point.

Step 8) An appropriate denoising threshold MP and a reachable distance RD may be set. According to the previously described manner, a parallelogram quadrilateral denoising kernel is constructed centered on the photon point a with the slope $\theta$ of the photon point a as an angle between an oblique edge of the parallelogram denoising kernel and the ground, an along-track distance as the height h, a the vertical distance as a base length s. Taking the photon point b around the photon point a as an example, a distance W between the photon point around the photon point a and the photon point a is determined using the following formula (7):

$$\begin{cases} \left| \dfrac{\left| y^a - y^b \right| - \left| (x^a - x^b) \right| \times \tan\theta}{s/2} \right| = a_1, \ \left| \dfrac{x^a - x^b}{h/2} \right| = a_2, |\theta| \leq 45° \\ \left| \dfrac{\left| x^a - x^b \right| - \left| (y^a - y^b) \right| \times \cot\theta}{s/2} \right| = a_1, \ \left| \dfrac{y^a - y^b}{h/2} \right| = a_2, |\theta| > 45° \end{cases} \tag{7}$$

$$\text{Max}(a_1, a_2) = a;$$

$$\sqrt{\left(a \times \dfrac{s}{2}\right)^2 + \left(a \times \dfrac{h_0}{2}\right)^2} = W;$$

where $y^a$ and $y^b$ represent the elevations of points a, b, $x^a$ and $x^b$ represent the horizontal along-track distance, $\theta$ is the slope of the center photon point a. When both $a_1$ and $a_2$ are less than 1, it is determined that the photon point b is within the parallelogram quadrilateral denoising kernel divided by the photon point a. Take the larger value of $a_1$ and $a_2$ to ensure that the newly generated denoising kernel has the same length-width ratio as the set denoising kernel. The smaller the distance W of between the photon point b and the photon point a, the smaller the reachable distance RD that meets denoising requirements.

Since the count of photon signal points obtained by LiDAR within a certain time is limited, the signal points in a region with a larger slope are sparser than those in a region with a smaller slope. Therefore, in order to make up for the signal loss in the horizontal direction, the denoising threshold MP is correspondingly reduced.

For example, the computer device determines the denoising threshold MP using the following formula (8):

$$\lceil MP \rceil = \begin{cases} \dfrac{MP}{D}, \theta < 45° \\ MP * \dfrac{h}{\dfrac{(s + |\cot\theta| * h)}{D}}, \theta > 45° \end{cases} \tag{8}$$

When calculating CD, the computer device multiplies MP by a coefficient to reduce the values of CD and RD by decreasing a count of required core photon points.

Step 9) The point cloud data of $O_0$ may be marked as the accessed point cloud data. The obtained $W_i$ (i=1, 2, . . . , n) are arranged in ascending order. The $O_i$ point with the smallest W value is selected as the access core photon point $O_1$, which is a center point of next denoising, i.e., the new point cloud data to be accessed.

Step 10) If the count of points $N_R(O_0)$ within the given radius R of point $O_0$ calculated by formula (4) is less than MP, point $O_0$ is recorded as a noise point in advance.

In formula (4), $W(O_0, O_i)$ is namely $W_i$, which is the W value of all point clouds around the central point $O_0$, and $W_i$ is the abbreviation of $W(O_0, O_i)$. $RD_R(O_0, O_i)$ is the reachable distance value RD(0) of the center point cloud of $O_0$, while $RD_R(O_i, O_i)$ is the RD(i) of the point $O_i$. When calculating RD, the same formula is used to calculate W. The obtained W values are sorted in ascending order and compared with CD, with the larger value recorded as RD. The CD value of each photon and the minimum RD value are counted.

Step 11) Since the noise points are more sparsely distributed than the signal points, the photons with large RD values are discriminated as noise photons, while those with small RD values are signal photons. During discrimination, firstly, the photon points in the window are sorted in the ascending order according to the RD values, and then an adaptive threshold is set for classification using the OTSU algorithm. For example, the computer device uses formula (5) to determine the interclass variance of the signal and noise points.

In formula (5), N is a total count of photons in the window, and P is the ranking position of the photon in the sorted sequence. Assuming that the first P photons are signal points and the following photons are noise points, the corresponding RD value is taken as the threshold for determining denoising, when the interclass variance $\sigma^2(P)$ between signal points and noise points is maximum.

Steps 5) to 11) are repeated until each photon point is labeled as visited to obtain the corresponding RD values of all the photon points. After sorting the RD values in the ascending order, the OTSU algorithm is used to classify the photon points into noise photon points and signal photon points to obtain the denoising results.

In the embodiments provided in the present disclosure, by incorporating a great number of slope-related influencing factors of denoising based on complex terrain, and improving the denoising algorithm combined with the characteristics of different photon densities at different slopes, the denoising process exhibits better resistance under varying slopes and densities in actual terrain, enabling the constructed denoising kernel to achieve effective denoising even in extreme terrain.

FIG. 9 is a schematic diagram of functional modules of a system for adaptive slope-based denoising of single-photon LiDAR point clouds according to some embodiments of the present disclosure.

The embodiments of the present disclosure further provide a system for adaptive slope-based denoising of single-photon LiDAR point clouds for implementing the above method for adaptive slope-based denoising of single-photon LiDAR point clouds. The solution provided by the system is similar to the implementation scheme described in the above method. Therefore, the specific limitations in one or more embodiments of the system for adaptive slope-based denoising of single-photon LiDAR point clouds provided below refer to the limitations of the method for adaptive slope-based denoising of single-photon LiDAR point clouds in the foregoing content, which will not be repeated here.

In some embodiments, as shown in FIG. 9, a system for adaptive slope-based denoising of single-photon LiDAR point clouds includes: an adaptive slope value calculation module M1, a quadrilateral denoising kernel construction module M2, a denoising kernel deformation module M3, a denoising kernel scaling module M4, an along-track vertex distance determination module M5, a reachable distance calculation module M6, a reachable distance threshold determination module M7, and a noise point removal module M8. Some modules may also include sub-units for implementing their functions. Of course, the architecture shown in FIG. 9 is only exemplary. When implementing different functions, one or at least two components of the system shown in FIG. 9 may be omitted as needed in practice.

Figure 10:
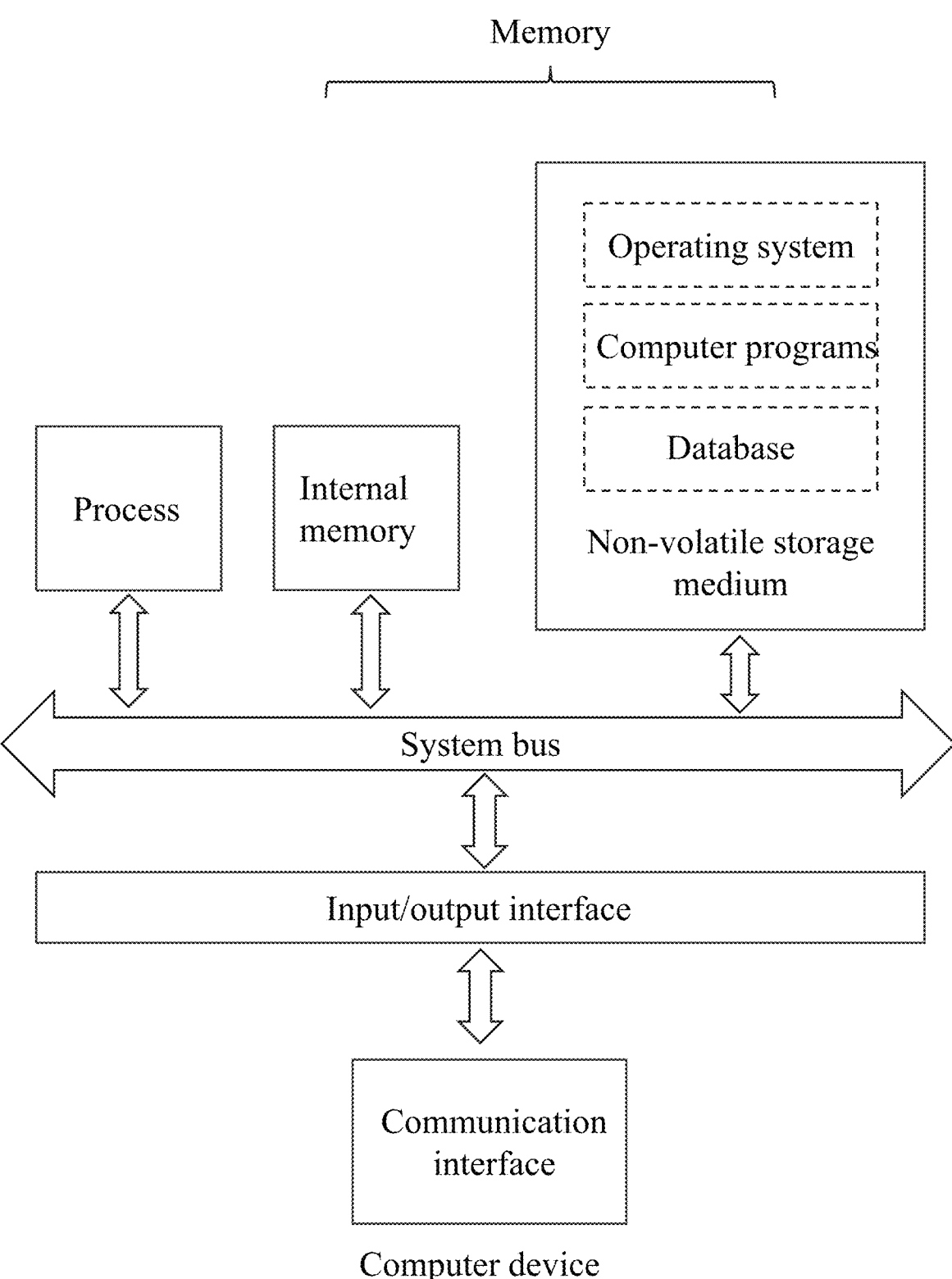
FIG. 10 is a schematic diagram illustrating a structure of a computer device according to some embodiments of the present disclosure.

FIG. 10 is a schematic diagram illustrating a structure of a computer device according to some embodiments of the present disclosure.

Some embodiments of the present disclosure further provide a computer device, which may be a server or a terminal, and an internal structure diagram of which may be shown in FIG. 10. The computer device includes a processor, a memory, an input/output interface (Input/Output, referred to as I/O for short), and a communication interface. The processor, memory, and input/output interface are connected via a system bus. The communication interface is connected to the system bus through the input/output interface. The processor is configured to provide computing and control capabilities. The memory includes a non-volatile storage medium and an internal memory. The non-volatile storage medium stores an operating system, computer programs, and a database. The internal memory provides an environment for the operation of the operating system and computer programs in the non-volatile storage media. The database is configured to store point cloud data set processing data. The input/output interface is configured to exchange information between the processor and external devices. The communication interface is configured to communicate with external terminals via a network connection. When executed by the processor, the computer program implements a method for adaptive slope-based denoising of single-photon LiDAR point clouds.

Those skilled in the art can understand that the structure shown in FIG. 10 is merely a block diagram of a portion of the structures related to the solution of the present disclosure, and does not constitute a limitation on computer devices to which the solution of the present disclosure is applied. The specific computer device may include more or fewer components than those shown in the figure, or combine certain components, or have different component arrangements.

Some embodiments of the present disclosure further provide a computer device, including a memory and a processor. The memory stores a computer program. When the processor executes the computer program, the steps in the above embodiments are implemented.

Some embodiments of the present disclosure further provide a non-transitory computer-readable storage medium, which stores a computer program. When the processor executes the computer program, the steps in the above embodiments are implemented.

Some embodiments of the present disclosure further provide a computer program product, which includes a computer program. When the processor executes the computer program, the steps in the above embodiments are implemented.

It should be noted that the user information (including but not limited to user device information, user personal information, etc.) and data (including but not limited to data used for analysis, stored data, displayed data, etc.) involved in the present disclosure are all information and data authorized by users or fully authorized by all parties, and the collection, use, and processing of relevant data need to comply with relevant regulations.

It can be understood by those skilled in the art that all or part of the processes in the methods of the above embodiments can be implemented by a computer program instructing relevant hardware. The computer program can be stored in a non-volatile computer-readable storage medium. When the computer program is executed, the computer program may include the processes of the embodiments of the above methods. Any reference to a memory, database, or other medium used in the embodiments provided in the present disclosure may include at least one of a non-volatile memory and a volatile memory. The non-volatile memory may include Read-Only Memory (ROM), magnetic tape, floppy disk, flash memory, optical memory, high-density embedded non-volatile memory, Resistive Random Access Memory (ReRAM), Magnetoresistive Random Access Memory (MRAM), Ferroelectric Random Access Memory (FRAM), Phase Change Memory (PCM), graphene memory, or the like. The volatile memory may include Random Access Memory (RAM), external cache memory, or the like. As an illustration and not as a limitation, RAM may be in a plurality of forms, such as Static Random Access Memory (SRAM), Dynamic Random Access Memory (DRAM), or the like.

The databases involved in the embodiments provided in the present disclosure may include at least one of a relational database and a non-relational database. The non-relational databases may include, but are not limited to, blockchain-based distributed databases, or the like. The processor involved in the embodiments provided in the present disclosure may be a general-purpose processor, a central processor, a graphics processor, a digital signal processor, a programmable logic device, a data processing logic device based on quantum computing, etc., without limitation.

The technical features of the above embodiments can be combined in any manner. For the sake of brevity, not all possible combinations of the technical features in the above embodiments have been described. However, as long as there is no contradiction in the combination of these technical features, the combination should be considered as within the scope described in the present disclosure.

Specific examples are used to illustrate the principles and implementation manners of the present disclosure. The descriptions of the above embodiments are only intended to help understand the method of the present disclosure and its core idea. Meanwhile, for those skilled in the art, based on the ideas of the present disclosure, there will be changes in specific implementation manners and application scopes. In conclusion, the contents of the present disclosure should not be construed as limiting the present disclosure.

In the embodiments of the present disclosure, when the operations are described step by step, unless otherwise specified, the order of the steps can be adjusted, the steps can be omitted, and other steps can also be included in the operation process.

It should be noted that the above descriptions are merely provided for the purposes of illustration, and not intended to limit the scope of the present disclosure. For persons having ordinary skills in the art, multiple variations and modifications may be made under the teachings of the present disclosure.

In one or more embodiments of the present disclosure, certain features, structures, or characteristics may be appropriately combined.

Aspects of the present disclosure may be implemented entirely hardware, entirely software (including firmware, resident software, micro-code, etc.) or combining software and hardware implementation. Any of the above hardware or software may be referred to as a "data block", "module", "engine", "unit", "component", or "system". Furthermore, aspects of the present disclosure may take the form of a computer program product embodied in one or more computer readable media having computer-readable program code embodied thereon.

The computer storage medium may be any computer-readable medium, which can be connected to an instruction execution system, device, or equipment to enable communication, propagation, or transmission of programs for use. The program code stored on a computer storage medium may be transmitted via any suitable medium, including radio, cable, fiber optic cable, RF, or similar media, or any combination of the foregoing media.

The computer program code required for the operation in each portion of the present disclosure may be written in any one or more programming languages. The program code may be run entirely on the user's computer, or run on the user's computer as a standalone software package, or run partially on the user's computer and partially on a remote computer, or run entirely on a remote computer or processing device. In the latter case, the remote computer may be connected to the user's computer through any form of network, such as a Local Area Network (LAN) or a Wide Area Network (WAN), or connected to an external computer (e.g., via the Internet), or in a cloud computing environment, or used as a service such as Software as a Service (SaaS).

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for adaptive slope-based denoising of single-photon LiDAR point clouds, comprising:
  determining, for any point cloud data in a point cloud data set, an adaptive slope value of the point cloud data based on an elevation and an along-track distance of each piece of point cloud data within two rectangular regions of equal size on two sides of the point cloud data;

selecting any point cloud data in the point cloud data set as point cloud data to be accessed;
  for the point cloud data to be accessed, constructing a quadrilateral denoising kernel of a preset size with the point cloud data to be accessed as a center;
  deforming the quadrilateral denoising kernel of the point cloud data to be accessed according to an adaptive slope value of the point cloud data to be accessed to obtain a deformed quadrilateral denoising kernel of the point cloud data to be accessed;
  scaling the deformed quadrilateral denoising kernel of the point cloud data to be accessed in equal proportion and determining an along-track vertex distance of each piece of point cloud data in the point cloud data set; wherein the along-track vertex distance of the point cloud data is a distance value from an along-track vertex to a center point of a newly generated quadrilateral denoising kernel of the point cloud data, which occurs when any edge of the deformed quadrilateral denoising kernel of the point cloud data to be accessed that is scaled in equal proportion collides with the point cloud data;
  determining a reachable distance of the point cloud data to be accessed and designating the point cloud data to be accessed as accessed point cloud data;
  designating point cloud data with a smallest along-track vertex distance as new point cloud data to be accessed, and jumping to the above operation including:
    for the point cloud data to be accessed, constructing a quadrilateral denoising kernel of a preset size with the point cloud data to be accessed as a center;
  until all point cloud data in the point cloud data set becomes accessed point cloud data; and
  sorting the reachable distance of each piece of accessed point cloud data, determining a reachable distance threshold using Otsu's Thresholding (OTSU) algorithm, and removing the accessed point cloud data whose reachable distance is greater than the reachable distance threshold as a noise point.

2. The method of claim 1, wherein the determining, for any point cloud data in a point cloud data set, an adaptive slope value of the point cloud data based on an elevation and an along-track distance of each piece of point cloud data within two rectangular regions of equal size on two sides of the point cloud data includes:
  constructing, for any point cloud data in the point cloud data set, the two rectangular regions of equal size with the point cloud data as a center point; wherein a length of each of the two rectangular regions in an elevation direction is two times a length in an along-track direction; and
  obtaining the adaptive slope value of the point cloud data based on the elevation and the along-track distance of each piece of point cloud data within the two rectangular regions.

3. The method of claim 1, wherein the adaptive slope value of the point cloud data is calculated according to a following formula:

$$\theta = \tan^{-1}(b);$$

wherein $\theta$ is the adaptive slope value of the point cloud data, and b is a slope value of the point cloud data;

$$b = \frac{h_r - h_1}{l_r - l_1};$$

wherein $h_1$ and $l_1$ are a length in an elevation direction and a length in an along-track direction of a rectangular region on a left side of the point cloud data, respectively, and $h_r$ and $l_r$ are a length in the elevation direction and a length in the along-track direction of a rectangular region on a right side of the point cloud data, respectively.

4. The method of claim 1, wherein the for the point cloud data to be accessed, constructing a quadrilateral denoising kernel of a preset size with the point cloud data to be accessed as a center includes:

for the point cloud data set, establishing a plane rectangular coordinate system with an along-track direction of all point cloud data as a positive direction of x-axis, and an upward direction perpendicular to the sea level as a positive direction of y-axis; and establishing a quadrilateral denoising kernel of a preset size with a slope of 0 in the plane rectangular coordinate system with the point cloud data to be accessed as a center point O; wherein the quadrilateral denoising kernel has four vertices clockwise from an upper left corner as a, b, c, and d, respectively, a length of the quadrilateral denoising kernel in the along-track direction is S, and a length of the quadrilateral denoising kernel in the elevation direction is h.

5. The method of claim 4, wherein the deforming the quadrilateral denoising kernel of the point cloud data to be accessed according to an adaptive slope value of the point cloud data to be accessed to obtain a deformed quadrilateral denoising kernel of the point cloud data to be accessed includes:

judging whether the adaptive slope value of the point cloud data to be accessed is greater than 45°, and obtaining a first judgment result;

if the first judgment result is no, moving the vertex a and the vertex d of the quadrilateral denoising kernel of the point cloud data to be accessed downward by a first deformation distance, and simultaneously moving the vertex b and the vertex c of the quadrilateral denoising kernel of the point cloud data to be accessed upward by the first deformation distance to obtain the deformed quadrilateral denoising kernel of the point cloud data to be accessed;

if the first judgment result is yes, then rotating the quadrilateral denoising kernel of the point cloud data to be accessed clockwise by 90° to obtain a rotated quadrilateral denoising kernel of the point cloud data to be accessed; wherein the rotated quadrilateral denoising kernel of the point cloud data to be accessed has four vertices counterclockwise from an upper right corner as a', b', c', and d'; and moving the vertex a' and the vertex b' of the rotated quadrilateral denoising kernel of the point cloud data to be accessed to right by a second deformation distance, and simultaneously moving the vertex c' and vertex d' of the rotated quadrilateral denoising kernel of the point cloud data to be accessed to left by the second deformation distance, to obtain the deformed quadrilateral denoising kernel of the point cloud data to be accessed.

6. The method of claim 1, wherein the scaling the deformed quadrilateral denoising kernel of the point cloud data to be accessed in equal proportion and determining an along-track vertex distance of each piece of point cloud data in the point cloud data set includes:

scaling the deformed quadrilateral denoising kernel of the point cloud data to be accessed in equal proportion, and when any edge of the deformed quadrilateral denoising kernel of the point cloud data to be accessed that is scaled in equal proportion collides with any point cloud data, taking the point cloud data to be accessed as a center point, generating the quadrilateral denoising kernel of the point cloud data through the point cloud data, until only the point cloud data to be accessed remains in the quadrilateral denoising kernel; and for the generated quadrilateral denoising kernel for the point cloud data when the deformed quadrilateral denoising kernel of the point cloud data to be accessed is scaled in equal proportion, determining the along-track vertex distance of the point cloud data.

7. The method of claim 6, wherein the along-track vertex distance of the point cloud data is calculated according to a following formula:

$$\sqrt{\left(a \times \frac{S}{2}\right)^2 + \left(a \times \frac{h_0}{2}\right)^2} = W;$$

$$\mathrm{Max}(a_1, a_2) = a;$$

$$\begin{cases} \left|\frac{\left|y^a - y^b\right| - \left|(x^a - x^b) \times \tan\theta\right|}{S/2}\right| = a_1, \left|\frac{y^a - y^b}{h/2}\right| = a_2, |\theta| \le 45° \\ \left|\frac{\left|x^a - x^b\right| - \left|(y^a - y^b) \times \cot\theta\right|}{S/2}\right| = a_1, \left|\frac{y^a - y^b}{h/2}\right| = a_2, |\theta| > 45° \end{cases};$$

wherein W is the along-track vertex distance of the point cloud data, and $h_0$ is a length of the quadrilateral denoising kernel of the point cloud data to be accessed in an elevation direction, S is a length of the quadrilateral denoising kernel of the point cloud data to be accessed in an along-track direction, $y^a$ and $y^b$ represent elevations of points a and b, respectively, $x^a$ and $x^b$ represent along-track distances of the points a and b, respectively, and $\theta$ is the adaptive slope value of the point cloud data to be accessed.

8. The method of claim 1, wherein the reachable distance of the point cloud data to be accessed is obtained by a following formula:

$$RD_R(O_0, O_i) = \begin{cases} \emptyset, & N_R(O_0) < MP \\ \mathrm{Max}(CD(O_0), W(O_0, O_i)), & N_R(O_0) > MP \end{cases};$$

$$CD(O_0) = \begin{cases} \emptyset, & N_R(O_0) < MP \\ W, & N_R(O_0) \ge MP \end{cases};$$

wherein MP is a denoising threshold, $N_R(O_0)$ is a count of points within a given radius R of the point cloud data Og, W is the along-track vertex distance of the point cloud data $O_0$, $\emptyset$ is a null set, $RD_R(O_0, O_i)$ is the reachable distance of the point cloud data Oi to be accessed, RD(i) is a shorthand for $RD_R(Q_0, 0_i)$, $W(O_0, O_i)$ is W value of all surrounding point clouds calculated with $O_0$ as a center point cloud, and W is a shorthand of $W(O_0, O_i)$.

9. The method of claim 1, wherein the reachable distance threshold is determined according to a following formula:

$$\omega_0(P) = \frac{P}{N};$$

-continued $$\omega_1(P) = N - \frac{P}{N};$$

$$\mu_0(P) = \frac{\sum_{i=1}^{P} RD(i)}{P}; \qquad 5$$

$$\mu_1(P) = \frac{\sum_{i=P+1}^{N} RD(i)}{N - P};$$

$$\mu(P) = \omega_0(P) \times \mu_0(P) + \omega_1(P) \times \mu_1(P); \qquad 10$$

$$\sigma^2(P) = \omega_0(P) \times (\mu_0(P) - \mu(P))^2 + \omega_1(P) \times (\mu_1(P) - \mu(P))^2;$$

wherein P is a labeling of current point cloud data to be accessed, N is a count of pieces of point cloud data, RD (I) is a reachable distance of an i-th point cloud data, and $\sigma^2$ (P) is an interclass variance of a signal point and a noise point; when $\sigma^2$(P) is maximum, the RD is a threshold for determining denoising.

10. A system for adaptive slope-based denoising of single-photon LIDAR point clouds, comprising a processor, a non-transitory computer-readable storage medium, and a computer program stored in the non-transitory computer-readable storage medium, wherein when executed by the processor, the computer program performs the method of claim 1.

\* \* \* \* \*